United States Patent [19]
Walczyk

[11] Patent Number: 5,793,015
[45] Date of Patent: Aug. 11, 1998

[54] APPARATUS FOR RAPIDLY FORMING LAMINATED DIES

[75] Inventor: Daniel Walczyk, Somerville, Mass.

[73] Assignee: MIT (Massachusetts Inst. of Technology), Cambridge, Mass.

[21] Appl. No.: 472,972

[22] Filed: Jun. 7, 1995

Related U.S. Application Data

[63] Continuation-in-part of Ser. No. 123,742, Sep. 20, 1993, abandoned.

[51] Int. Cl.[6] .............................. B23K 26/00; B21K 5/20
[52] U.S. Cl. ........................... 219/121.67; 219/121.82; 83/92; 83/418; 83/177; 76/4
[58] Field of Search ................ 219/121.67, 121.72, 219/121.82; 76/4, 107.1; 83/92, 446, 614, 644, 418, 177; 271/3.24

[56] References Cited

U.S. PATENT DOCUMENTS

| | | |
|---|---|---|
| 3,375,568 | 4/1968 | Kelsey. |
| 3,932,923 | 1/1976 | DiMatteo ............................ 29/407.05 |
| 5,031,483 | 7/1991 | Weaver ................................. 76/107.1 |
| 5,071,503 | 12/1991 | Berman ................................ 156/250 |
| 5,247,861 | 9/1993 | Jahn ..................................... 76/107.1 |
| 5,354,414 | 10/1994 | Feygin ............................... 219/121.65 |
| 5,367,929 | 11/1994 | Burch et al. ............................ 83/177 |

FOREIGN PATENT DOCUMENTS

| | | | |
|---|---|---|---|
| 0454620 | 10/1991 | European Pat. Off. .......... 219/121.67 |
| 2743544 | 3/1979 | Germany .......................... 219/121.67 |
| 6-99296 | 4/1994 | Japan ............................... 219/121.67 |

*Primary Examiner*—Geoffrey S. Evans
*Assistant Examiner*—Gregory L. Mills
*Attorney, Agent, or Firm*—Bruce F. Jacobs

[57] ABSTRACT

An improved apparatus for forming profiled edge lamination (PEL) dies rapidly and accurately is disclosed.

29 Claims, 6 Drawing Sheets

APPARATUS FOR RAPIDLY FORMING LAMINATED DIES

CROSS-REFERENCE TO RELATED APPLICATION

This application is a continuation-in-part of U.S. Ser. No. 08/123,742, filed Sep. 20, 1993 now abandoned.

U.S. GOVERNMENT RIGHTS

The U.S. government has rights to this invention by virtue of the National Science Foundation Grant Number DDM-9202362.

BACKGROUND OF THE INVENTION

Products made by sheet metal forming processes are everywhere. They include car body panels, aircraft body skins, kitchen appliance shells, cooking utensils, and modern office furniture. Sheet metal parts are most commonly made by deforming a flat sheet metal blank between two matched rigid dies, a male and a female. Only one rigid die is needed to form sheet metal parts by using stretch-forming, hydroforming, rubber forming, or hydro-mechanical drawing methods. Regardless of whether one or two dies are required for producing a part, the development of the correct die shape is complicated by the inherent springback in the metal due to elastic recovery as well as the change in shape of the stamped part after its edges are trimmed and residual stresses are relieved. This forming behavior makes the development of sheet metal dies both time-consuming and expensive. For example, the development of production stamping dies for a car body panel can take up to 12 months and cost up to $1,000,000. Consequently, the sheet metal forming sector of industry has expressed the need for the reduction of lead time and investment cost in die development.

One of the most time-consuming and expensive procedures in the die development process is the fabrication and reconfiguration of the forming dies. Many different methods have been used to fabricate rigid sheet metal forming dies. In industry, current methods include Computer Numerically Controlled (CNC) machining of a block of metal, casting the shape (usually of cast iron, steel, or a zinc alloy) and "burning" the shape into a metal block using Electro-Discharge Machining (EDM). Newer methods that are being used include stacking and bonding horizontally-oriented contoured laminations (thin plates) to form a topographical-like forming surface, and stacking and securing vertically-oriented Profiled-Edge Laminations (PEL) whose top edges form a segmented forming surface. This invention is directed to improvements in the fabrication of PEL dies.

Currently, PEL dies are fabricated using multi-axis (4 axis minimum) CNC laser cutters. These types of machines are designed for general industrial use and not optimized for cutting profiled-edge laminations in terms of speed, cost, and factory floor space required. In fact, currently laminations must be manually loaded to form a PEL die, significantly increasing the fabrication time. An industrial-size CNC laser cutter generally costs over half a million dollars and the floor area required for a machine is at least 10 times it's work area. For these reasons, dedicated stand-alone machines for fabricating PEL dies are needed for PEL dies to become widely embraced by industry.

SUMMARY OF THE INVENTION

The present invention is directed to an apparatus which is designed to continuously cut blank lamination members one-by-one to form a contoured top edge on the lamination members and thereby form a PEL die. The apparatus stores the die lamination members after they have been cut in a side-by-side stacked array to form a die by clamping together the lamination members. Generally, the apparatus comprises a device for cutting lamination blanks, a means for advancing lamination blanks one-by-one in front of the cutting device, a means for placing lamination blanks one-by-one on the advancing means, and a receiving container disposed adjacent the advancing means, which container receives the cut die lamination members and stores them in a side-by-side vertical stacked array so as to form a die.

More specifically, in one embodiment the apparatus comprises a loading container, a sliding guide disposed adjacent to the loading container, a means for placing lamination blanks, one-by-one, onto the sliding guide, a means for advancing a lamination blank along the sliding guide, a lamination cutting device disposed adjacent the sliding guide so that a lamination blank advancing along the sliding guide passes in front of the laser cutting device, and a means for disposing a die lamination that has advanced completely past the lamination cutting device and has been cut into a receiving container. The disposing means works simultaneously with the placing means so that when a cut lamination is disposed in the receiving container another lamination blank is simultaneously placed in the sliding guide.

In a second embodiment, the apparatus comprises a loading container; a gripping means disposed adjacent to the loading container; a means for placing a lamination blank into the gripping means; a means for advancing the lamination blank in the gripping means into a stationary cutting position; a movable lamination cutting device disposed adjacent the gripping means so that the cutting device passes in front of a lamination blank which has been advanced into cutting position by the gripping means, the lamination cutting device being movable along the length of the lamination blank; and a means for disposing a cut die lamination into a receiving container after the cutting device has advanced completely past the cut lamination. The disposing means works in combination with the placing means so that when a cut lamination is disposed in the receiving container another lamination blank is placed in the gripping means.

Figure 1:
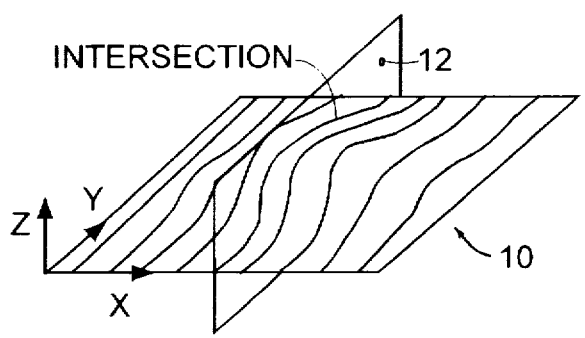
FIGS. 1–3 are perspective views of top surface models of a PEL die and portions thereof which are formed by use of this invention.
Figure 2:
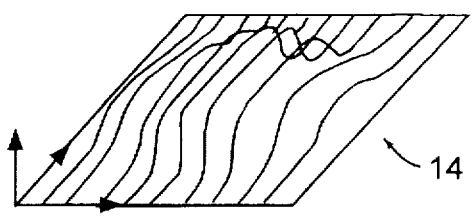
Figure 3:
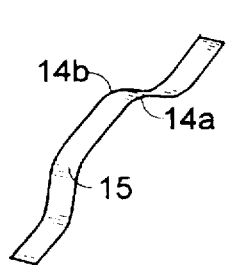

The first step in the creation of a PEL die entails forming a 3-dimensional model of the desired top surface of the die. The 3-dimensional surface will correspond to the surface contours of a part, commonly sheet metal, to be formed using the die. The 3-dimensional surface model is typically produced in a computer assisted design (CAD) program by a die designer. As shown in FIG. 1, if the 3-dimensional model 10 is intersected by a y-z cutting plane 12 through a certain point on the x-axis, a dimensional curve results. Furthermore, if the y-z plane is repositioned along the x-axis by constant increments, such as 1 mm, the collection of curves 14 produced by each of the same plane/surface intersections will approximate the shape of the original 3-D surface as seen in FIG. 2. FIG. 3 illustrates that the true 3-D surface between two adjacent curves 14a and 14b can be approximated by connecting them with a bevel 15. This connecting bevel constitutes the profiled-edge of each PEL die lamination. Note that the approximation of the 3-D surface gets better as the curves get closer together, i.e. as the x-increment decreases. This collection of curves serves as the database for creating a PEL die with the desired forming surface.

Figure 4:
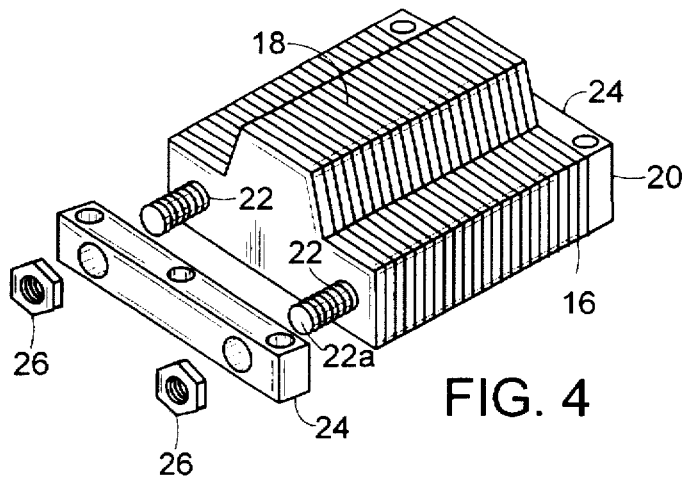
FIGS. 4 and 5 are perspective views of other dies of this invention.
Figure 5:
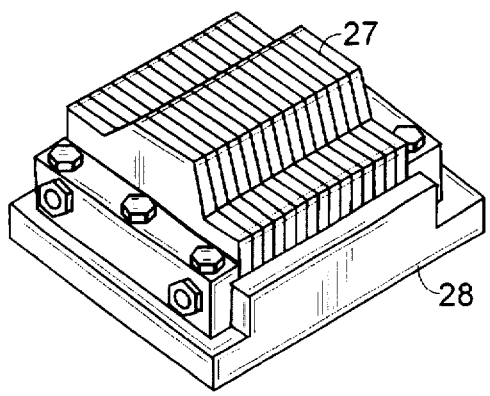

As seen in FIG. 4, a PEL die generally comprises a plurality of die lamination members 16, each die lamination member being substantially planar and each being disposed in a vertical plane and stacked together side-by-side in an array. The top surface 18 of the die is continuous in the y-direction and approximated in the x-direction. Before placing the die in a stamping press, the plurality of die laminations 16 are secured together in a vertical array. While this may be accomplished by any suitable technique, an example of a particularly preferred technique is shown in FIGS. 4 and 5. The die lamination members may be held together in a stacked array by any suitable means, but preferably a clamping device as shown in FIG. 5. As shown in FIG. 4, two holes are uniformly positioned in the sides of each member of the PEL which allows a clamped PEL die assembly 20 to secure the entire array of laminations. The clamp consists of two round shafts 22 which are slightly smaller than the plate holes and are rigidly connected to a crossbar 24 at each end of the die. The free ends 22a of the shafts 22 are threaded so that the bars 24 can be secured to the die with another crossbar 24 and two nuts 26. As shown in FIG. 5, the clamped PEL die 27 is placed on a U-shaped baseplate 28 which restrains the y-direction movement of the plurality of lamination members. The two crossbars 24 of the clamped die assembly 27 are then rigidly bolted to the base plate 28 to prevent x-direction movement and y-axis rotation of the PEL laminations. No adhesive or other means of holding the plurality of die lamination members together is required. The PEL die can be made into a solid die apart from this process by suitable means (e.g. diffusion bonding metal lamination members together) if needed or desired. Generally at least a portion of the die lamination members have a continuously changing beveled top edge. When placed together in a vertical stacked array, the top edges of the die lamination members, in the aggregate, form the top surface of the die and the bottom surfaces provide a flat base plate for the laminations to be pushed up against during the forming operation and to constrain the array both horizontally and in rotation.

The use of the present apparatus for forming a PEL die offers several advantages over the state-of-the-art processes. The speed at which a sheet metal forming die can be fabricated is very important because it directly reduces the lead-time of die development. CNC-machined, cast, and EDM dies take one or more days (sometimes weeks) to fabricate since a CNC die requires removal of a large amount of material (hogging); a cast die requires a master model and time-consuming casting procedures; an EDM die requires an electrode the inverse shape of the intended forming surface and the machining is done at an extremely slow rate; and all three procedures require the die surface to be polished. Furthermore, machining and assembling a die made of contoured laminations takes longer than PEL dies of similar thickness because of the more complicated lamination handling system required. The apparatus of this invention in the first embodiment has a particular inherent advantage over other methods because the cutting head only is required to move along the z-axis and be rotated about the y-axis while the lamination blanks are advanced past the cutting means. In the apparatus of the second embodiment, the cutting head is only required to move along the y-axis while the lamination is rotated about the y-axis and translate radially. Therefore, in both cases the y-axis (the lamination handling system alone or including the cutting device) is the only direction of the apparatus that need be increased in size to produce larger dies. In prior art die forming machines (machining center, CNC laser cutter, etc.), the cutting means must travel along at least 2 axes and thus both axes would need to be lengthened. Due to the unlimited length of a die lamination and the unlimited number of laminations that can be in a die array, any die size is easily attainable with the present apparatus.

DESCRIPTION OF THE INVENTION

A PEL die prepared in accordance with this invention takes the least time to fabricate, when compared with other die preparation procedures—on the order of only about 30 minutes for a 0.3 meter square die. Such rapid fabrication is accomplished by combining a rapid cutting method with a quick handling system. The present invention is directed to an improved apparatus for producing PEL dies in a relatively fast and efficient manner, especially for use in sheet metal forming. The apparatus will be referred to herein as a die lamination profiling (DLP) machine.

A first embodiment (FIGS. 6–8) of the DLP apparatus machines bevels into a lamination by rotating the cutting nozzle about it's focal or center point as the lamination moves past it. A second embodiment (FIGS. 9–11) of the apparatus machines bevels into a lamination by rotating the lamination about the focal or center point of the cutting nozzle as the cutting nozzle moves past the lamination.

Figure 6:
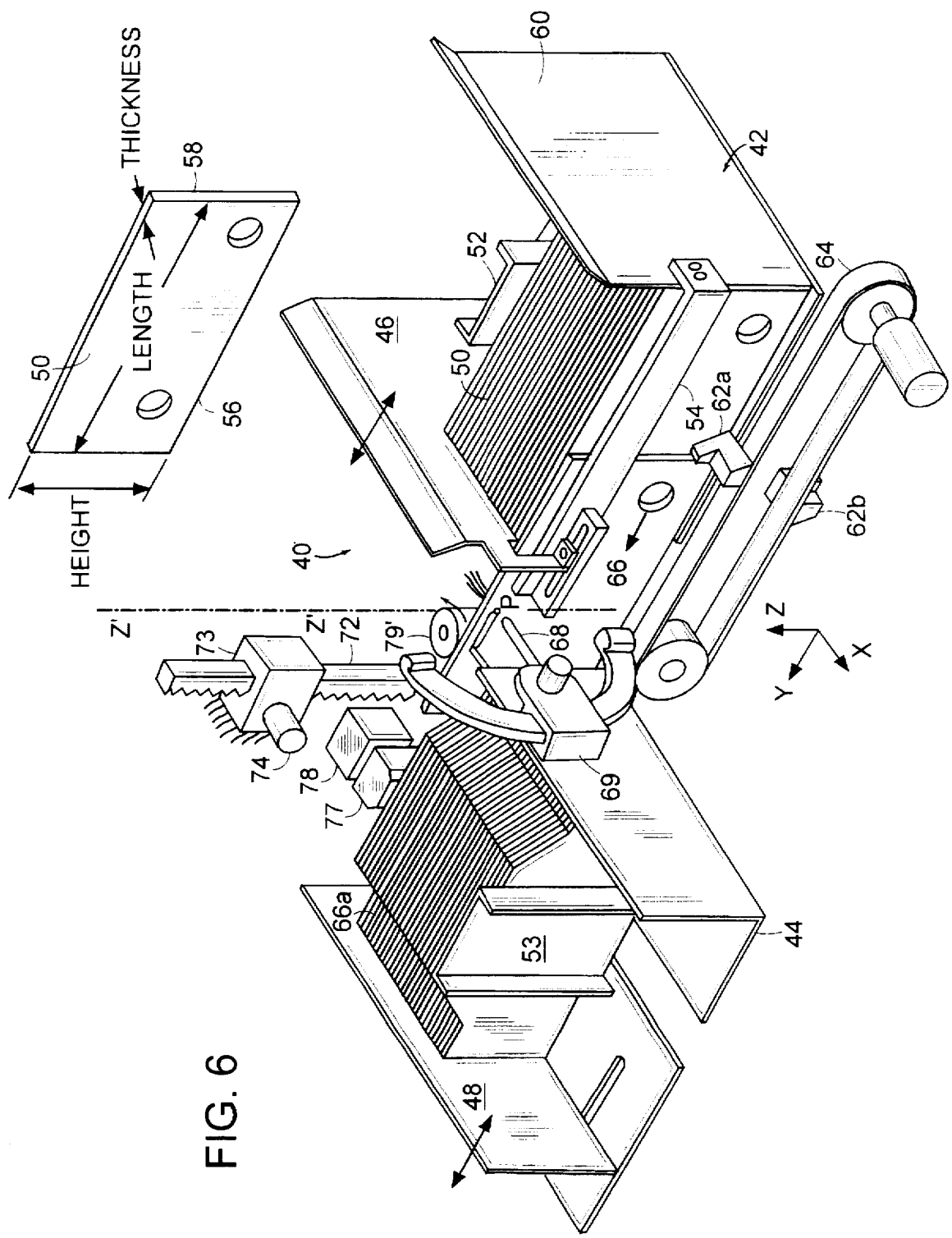
FIG. 6 is a perspective view of a die forming apparatus in accordance with this invention.

As shown in FIG. 6, a first embodiment of the DLP machine fabricates a PEL die in the following manner. The DLP machine 40 contains a loading container 42 and a receiving container 44. The side walls 46 and 48 of the loading and receiving containers 42 and 44, respectively, are adjustable to correspond to the length of the lamination blanks 50 and profiled-edge laminations 66a. In operation, an array of die lamination blanks is placed into the loading container 42 between the loading container pusher 52 and the sliding guide 54. Each rectangular lamination blank 50 has it's bottom edge 56 and one side edge 58 machined flat and perpendicular to one another for registration purposes. Prior to a lamination blank 50 being cut to shape, the machined side edge 58 is held in contact with the fixed front wall 60 of the loading container 42 by means of movable side wall 46.

Figure 7A:
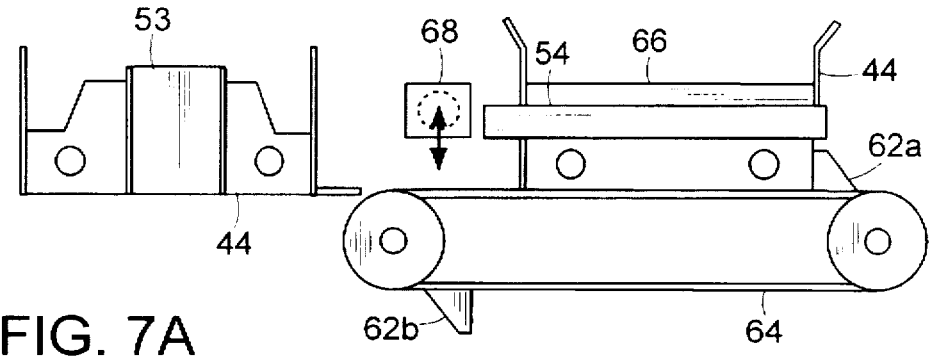
FIGS. 7A and 7B illustrate details of the slider timing belt.
Figure 7B:
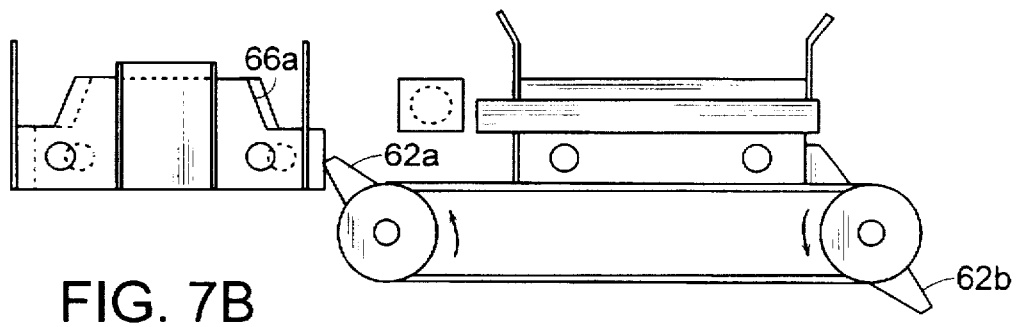
Figure 8:
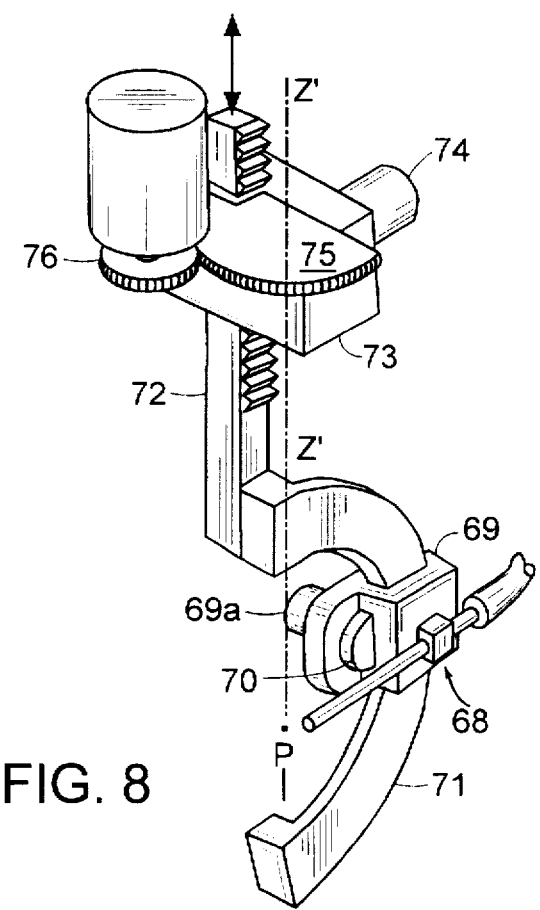
FIG. 8 illustrates details of the reverse side of the cutting means of FIG. 6.

As best shown in FIGS. 7A and 7B, a lamination pusher 62a attached to a conveyor belt/chain 64 contacts the perpendicular registration corner of a single lamination blank 50 and horizontally moves it past the vertically-moving and rotating cutting device 68. As is best illustrated in an isolated view in FIG. 8, the cutting head 68 (abrasive water jet cutting device shown) which is rigidly mounted on a carriage 69, rotates about it's focal or center point by moving on a circular track 71. Other cutting means can be used to machine the laminations and are discussed in detail below. The carriage 69 moves along the circular track 71 by using a friction drive or spur gear/track arrangement 70 which is driven by a servomotor 69a. The circular track 71 is rigidly connected to a vertical track member 72 which moves in a stationary guide 73. Vertical motion of the circular track 71 and the cutting device 68 is accomplished by a spur/track arrangement 74. In this configuration, the DLP machine has three degrees of freedom, y-axis translation, z-axis translation, and y-axis rotation.

If bevel cuts about the z-axis are required, the carriage 73 is allowed to rotate about vertical axis z'—z' which goes through the focal or center point P of the cutting device. Rotation of the carriage 73 is afforded by an attached gear 75 which rotates about the z'—z' axis. A servomotor driven spur gear 76 engages and rotates the driven gear 75. The combination of the cutting heads rotations about the y and the z axes which go through point P allows for compound beveling. In this configuration, the DLP machine has four degrees of freedom: y-axis translation, z-axis translation, y-axis rotation, and z-axis rotation.

Before the newly-cut lamination slides into the receiving container, a lamination indexer 77 which is actuated by a solenoid or an air cylinder (78) pushes the existing cut laminations ahead by one lamination thickness and then returns to its retracted position. Simultaneously, the receiving container retracting wall 53, actuated by a motor-driven leadscrew, retracts by the same amount. This combination of motions allows a newly-cut die lamination 66a to slide into the receiving container 44 with minimal resistance. A bevel corresponding to the desired 3-D surface slice is cut into the lamination as it moves past the cutting device 68. An optional rotating grinder head 79 (CCW rotation in FIG. 6 when viewed from above) mounted vertically grinds off any machining burrs left on the backside of the beveled cut. When the sliding die lamination 66 and pusher 62a clear the loading container 42, the loading container pusher 52, which is actuated by a motor-driven leadscrew, indexes forward one lamination thickness in order to push the next die lamination blank against the sliding guide 54. Finally, the pusher 62a stops moving when the newly-cut die lamination 66 is completely within the receiving container 44. At this point, the next pusher 62b attached to the conveyor belt/chain 64 is positioned to begin sliding another die lamination blank 50 out of the loading container 42. Since each lamination is handled in a similar fashion, the ordering of the die laminations within a die is accomplished by the apparatus itself. Either blank or previously cut die laminations can be machined with this apparatus. The entire operation of the DLP machine including the receiving container pusher 52, the die lamination conveyor belt/chain 64, the circular track servomotor 76 for the cutting device, the vertical activator for the cutting head and circular tracks, the rotational activator for the cutting head and circular tracks, cutting device control settings (e.g. speed, power), lamination indexer actuator 75, and receiving container retractor 53 will preferably be controlled by a single high speed computer. Any suitable materials may be used in the construction of the apparatus, such as metal, composites, and high-strength polymers. Preferably, the majority of the machine components are made of metal.

Figure 9:
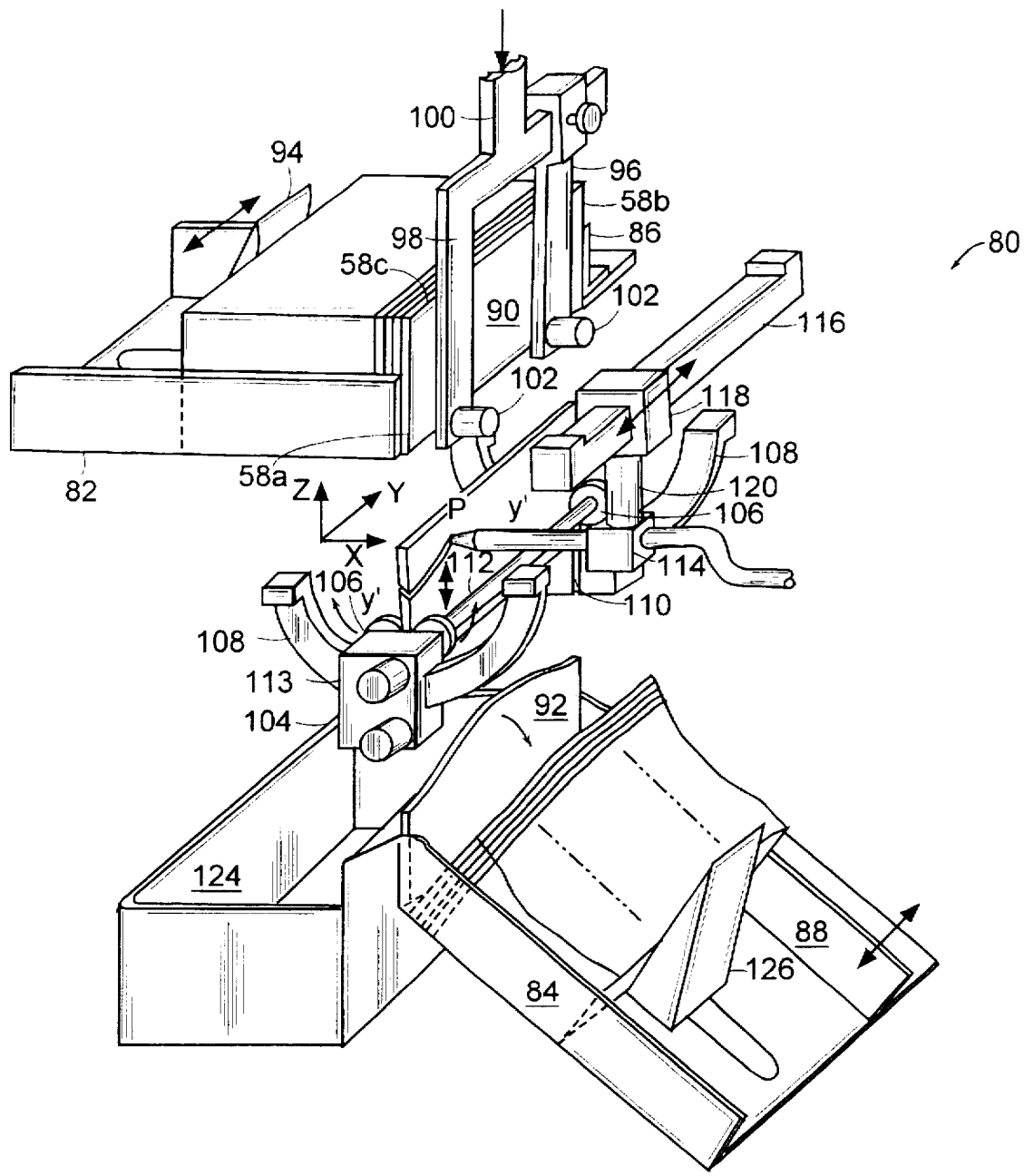
FIG. 9 is a perspective view of a second die forming apparatus in accordance with this invention.
Figure 10A:
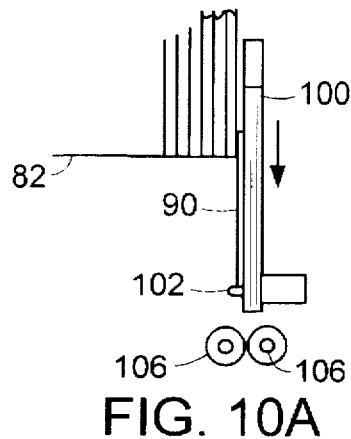
FIGS. 10A and 10B are side views of the operation of the gripping rollers of FIG. 9.
Figure 10B:
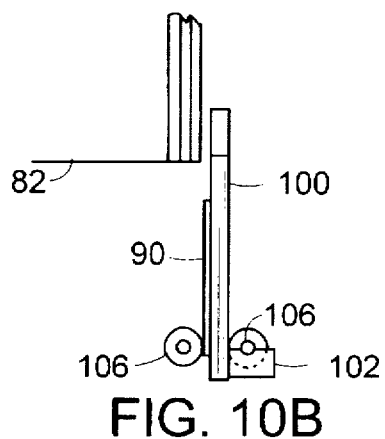
Figure 11:
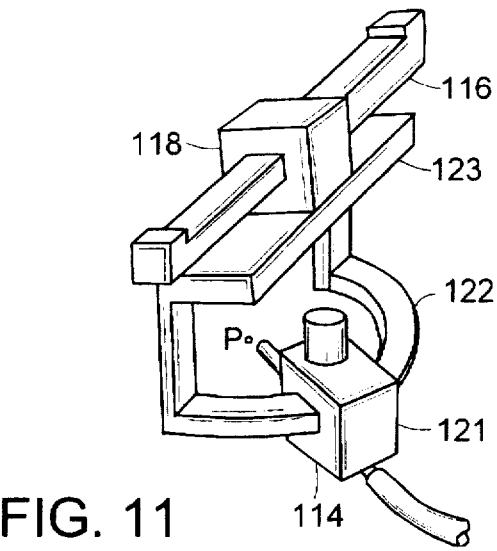
FIG. 11 illustrates details of the cutting means of FIG. 9.

As shown in FIGS. 9–11, the second embodiment of the DLP machine fabricates a PEL die in the following manner. In this case, the DLP machine 80 contains a single loading container 82 and an inclined receiving container 84. The side walls 86 and 88 of the loading and receiving containers respectively are adjustable to correspond to the length of the die lamination blanks 90 and cut die laminations 92. In operation, an array of unprocessed die laminations 90 is placed between the loading container pusher 94 and the two verticalarms 96 and 98 of the lamination descending mechanism 100. One arm (far arm 96 in FIG. 9) of the lamination descending mechanism 100 is adjustable to accommodate different length laminations that will be processed. The die lamination 90 in contact with the descending mechanism 100 extends beyond the bottom edge of the loading container floor (not shown) and therefore is completely supported by the retracting pins 102 of the mechanism.

For a die lamination 90 to be loaded into the processing carriage 104, the lamination descending mechanism 100, as best seen in FIGS. 10A and 10B, lowers the unprocessed die lamination 90 until it's bottom edge 56 comes in contact with the two sets of gripping rollers 106 of the carriage 104. When this occurs, the retracting pins 102 retract to release the loaded lamination 90 as shown in FIG. 10B. The descending mechanism 100 then raises back to it's original position, the retracting pins 102 are extended, and the loading container pusher 94 indexes the lamination blanks forward by the thickness of one lamination to ready the next die lamination for processing.

After a die lamination 90 is loaded into the processing carriage 104, the lamination gripping rollers 106 serve as a friction drive which moves (translates) the lamination in the radial direction of the processing carriage circular tracks 108. The side edges 58a and 58b of the lamination blank 90 are also guided by radially-oriented slots 110 in the processing carriage 104 which constrains the lamination's movement to the radial direction. Before cutting takes place, four gripping rollers 106 (two on each side of the lamination blank 90) translate the lamination blank 90 to it's initial cutting position. A pair of the gripping rollers 106 on one side of the lamination blank 90 are connected with a shaft 112 and this shaft is actuated by a servo-driven DC motor (113).

The cutting head 114 for the cutting means is initially focused on one side edge of the lamination blank 90. The cutting head 114 translates on a linear track 116 along the y-axis (constraining the head in the x-z plane) with it's linear motion coming from any suitable means, e.g. servo-driven lead screw (not shown). The linear track 116 must be raised well above the level of the cutting head 114 so that it doesn't interfere with the DLP's circular tracks 108 (discussed below). The cutting head 114 is connected to the linear track carriage 118 by a vertical offset post 120. The combination of the lamination's radial translation from the servo-driven gripping rollers 106 and the y-axis motion of the cutting head 114 allows a profile to be cut into the top edge 58c of the lamination blank 90. When the cutting head 114 has finished cutting the lamination, the head preferably remains in it's finished position and begins cutting the next lamination blank from this side. An air nozzle (not shown) located on the cutting side of the lamination 90 may be used to blow the cut lamination material to be discarded to the side opposite of the lamination receiving bin 84 and into a recycling bin 124.

While the profile is being cut into the lamination 90, the ability to make bevel cuts is afforded by the lamination processing carriage 104 riding on the circular tracks 108. The axis of rotation of this track y'—y' coincides with the immediate focal or center point P of the cutting head 114. This feature eliminates the need for moving the cutting head 114 in and out (along the x-axis) as the lamination 90 is rotated about the y-axis. The processing carriage 104 is moved along the circular tracks 108 by any suitable means, but a motor-driven spur gear/track arrangement (not shown) is preferred. A bevel corresponding to the desired 3-D surface slice is cut into the lamination blank 90 as it translates radially and rotates about the y'—y' axis and as the cutting head 114 translates along the x-axis.

Once the appropriate beveled profile cut is made in the lamination and the waste material is blown into the recycling bin 122, the sets of gripping rollers 106 lower the newly-cut lamination 92 until it drops into the inclined receiving container 84. The newly-cut lamination 92 then rotates about it's bottom edge which is in contact with the receiving container 84, and settles to the rear of the stack of previously-cut laminations, thus maintaining the correct order for a specific die. After the newly-cut die lamination 92 settles in the receiving container 84, the receiving container retracting wall 126, actuated by a motor-driven leadscrew (not shown), retracts downward by one lamination thickness in preparation for the next newly-cut lamination to be lowered into the receiving container.

The second embodiment for the DLP machine can also be fitted with a mechanism to allow for bevel cuts about the z-axis. The combination of the lamination's y-axis rotation and the cutting head's z-axis rotation thereby allowing for compound beveling since the machine will then have 4 degrees of freedom (Y and Z translational, and Y and Z rotational). Instead of the cutting head 114 being directly mounted to the linear track carriage 118 with an offset post 120 as shown in FIG. 9, the cutting head 114 is mounted as shown in FIG. 11 with an offset post 120 to a carriage 121 mounted on a circular track 122. The cutting head carriage 121 is moved along the circular track 122 by means of a spur gear/track arrangement. The circular track 122 is rigidly connected to the y-axis linear track carriage 118 by an offset bracket 123.

Since each lamination is handled in a similar fashion, the ordering of the die laminations is automatically preserved by use of this apparatus. Either blank or previously cut die laminations can be machined with the apparatus. The entire operation of the second embodiment 80 including the loading container pusher 94, the lamination descending mechanism 100, the lamination retracting pins 102, the lamination gripping roller sets 106, the lamination processing carriage 104, the y-axis linear track carriage 116, the cutting head circular track carriage (122) (if used), the receiving container retracting wall 126, and the cutting means control settings (e.g. speed, power) are preferably controlled by a single high speed computer. Any suitable materials may be used in the construction of the apparatus, such as metal, composites, and high-strength polymers. The majority of the machine components are made of metal.

There are three preferred cutting methods for cutting bevels into the thin laminations. There are two non-traditional machining methods, i.e. cutting with a laser, preferably an Nd:YAG laser, using hard-optic or fiber-optic beam delivery and cutting with an abrasive water jet cutter, and one traditional method, machining a slot with the flute-edge of an end mill.

Figure 12A:
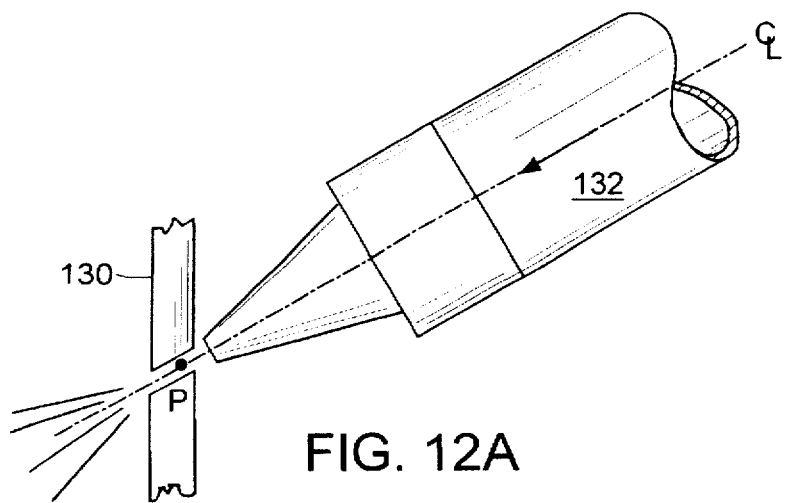
FIGS. 12A, 13 and 14 are perspective views of cutting devices useful with the apparatus of this invention.
Figure 12B:
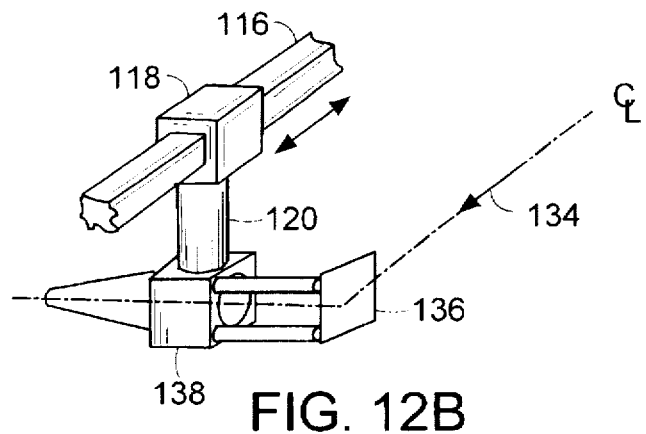
FIG. 12B is a perspective view of a cutting means useful with the apparatus of this invention.

As shown in FIG. 12A (inclined beam delivery nozzle shown), a die lamination 130 can be machined by using a high-powered Nd:YAG laser cutter 132 with a highly focused laser beam (e.g. 0.15 mm diameter) which is delivered by a fiber optic. The melted material at the laser focal point P is blown away by a high-velocity coaxial gas jet (not shown). With laser cutters there is no tool wear and the maximum cutting rate through a particular material is not affected by the material hardness, only by it's melting point. The focal point P of the laser is typically located 0 to 30% into the thickness of the workpiece (lamination). If the laser beam is delivered with hard optics, the cutting means arrangement shown in FIG. 12B can be used for the second embodiment in which a laser beam 134 is redirected by a 45° mirror 136 through a cutting head 138 which is attached to a y-axis linear track carriage 118 by off-set post 120. The track carriage 140 is moved along y-axis linear track 116 as needed by any suitable means.

Figure 13:
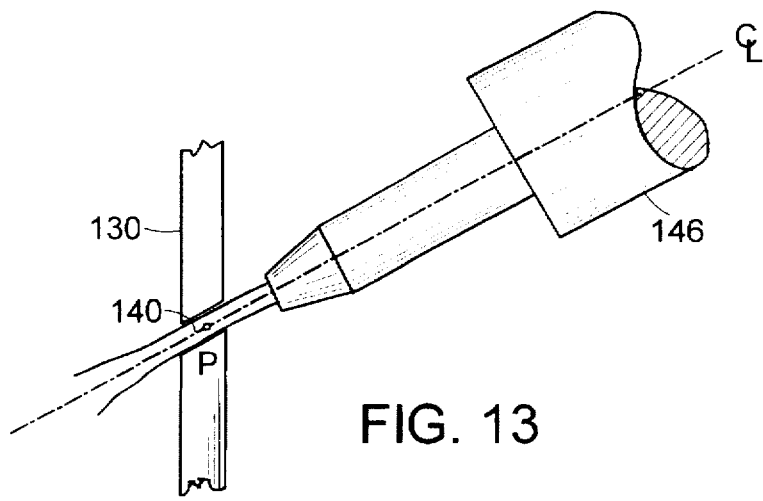

Although Nd:YAG laser cutting is the currently preferred machining method, an abrasive water jet cutter, as shown in FIG. 13 (inclined cutting nozzle shown), may also be used. An abrasive water jet cutter creates a high-velocity water jet which carries fine abrasive particles (e.g. garnet) in suspension through a nozzle 146. The abrasive particles act like a saw to cut a narrow groove in the lamination 130. The center point P of the water jet is the center point of the rhombus-shaped kerf 140 that is cut out of the lamination 130.

Figure 14:
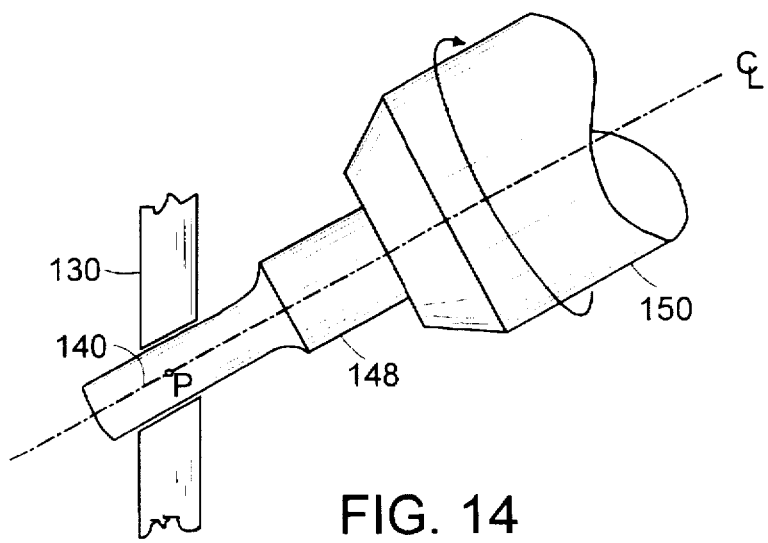

The conventional method of machining a bevel into a lamination 130 is with the flute-edge of an end mill 148 as is shown in FIG. 14 (inclined CNC milling spindle 150 shown). The minimum radius that can be machined into the profiled-edge of the die lamination 130 is limited by the radius of the end mill 148. To avoid excessive tool wear and breakage, the maximum cutting speed and rotational speed at which the laminations can be machined is limited by the material composition and hardness of both the lamination and the end mill. The center point P of the end mill 148 is the center point of the rhombus-shaped cut 140 that is machined out of the lamination 130.

The thickness of the laminations to be used for a particular die will be based upon many factors including the geometric detail of the die, the allowable approximation error due to the bevels, whether or not an interpolator is used, and the required strength of a single protruding lamination subjected to the expected maximum forming load at that point. Thick laminations on the order of about 2 to 6 mm may be used in stamping dies for parts with broad part details like aircraft skins and certain car body panels. Thinner laminations (between about 1 and 2 mm) may be used in stamping dies for parts with finer details and higher localized forming pressures like appliance covers (e.g. toasters), and cooking utensils. Laminations below 1 mm in thickness, e.g. 0.5 to 0.99 mm) would be used in stamping dies for fine part details but low forming pressures because of the potential for plate buckling or bending. Lamination thicknesses in a PEL die need not all be the same. For instance, if there is a section of a die which is of uniform cross-section or requires higher forming strength, thicker laminations may be used in that section than in the balance of the die.

The apparatus of the present invention forms PEL dies which are usable in a variety of industrial stamping processes such as plastic thermoforming and composite lay-ups. However, it is particularly useful in forming PEL dies for use in sheet metal forming operations. In a sheet metal forming operation, a PEL die will usually be made out of thin hardened steel plates. A pair of steel dies can be created and mounted in a stamping press for matched-die forming. Many sheet metal forming processes involve only one die (male or female) which can easily be fabricated with the DLP machine. These processes include hydroforming, rubber-forming, stretch-forming, and explosive-forming.

A PEL die made of aluminum or hard plastic laminations can be used for thermoforming plastic sheet. Thermoforming involves forming thermoplastic sheet or film over a die (male or female) with the application of heat and pressure differentials and such dies conventionally contain holes extending from the die surface to the back of the die through which a vacuum can be drawn. Typical parts made with this process include advertising signs, appliance housings and liners, and packaging.

For the molding of composite materials, a single PEL die or a matched pair of dies can be used. Such a die can be made of aluminum or plastic sheet. Two conventional methods of composite forming are pressure-bag molding and vacuum-bag molding. In pressure-bag molding, a composite material is placed on a mold and pressure is applied to the lay-up with a pressurized flexible bag. Sometimes the molds are heated to accelerate the composite hardening and the dies are then mounted to heated surfaces and allowed to heat up themselves. Vacuum-bag molding involves laying prepregs, which are uncured composites in tape form, on the mold to form the desired shape. In this case, the pressure required to form the shape is obtained by covering the lay-up with a plastic bag and creating a vacuum. Typical composite pans include car fenders, appliance housings, and boat hulls.

What is claimed is:

1. An apparatus for cutting a plurality of lamination blanks into die lamination members to form a die comprising a cutting means comprising a cutting device for cutting lamination blanks; a means for advancing lamination blanks one-by-one to a cutting position in front of the cutting device; a means for placing lamination blanks one-by-one in the advancing means; and a receiving container disposed adjacent the advancing means, which container receives the cut die lamination members and stores them in a horizontal side-by-side vertical stacked array so as to form a die.

2. The apparatus of claim 1, wherein the plurality of die lamination members are formed one-by-one by passing the lamination blanks one-by-one through a die lamination profiling device containing the cutting means which cuts the lamination blanks so as to form the die lamination members.

3. The apparatus of claim 2, wherein the lamination blank has a flat bottom surface.

4. The apparatus of claim 1, wherein the cutting device has a cutting head rotatable about its focal point.

5. The apparatus of claim 1, further comprising a computer for controlling the operation of the apparatus.

6. The apparatus of claim 1, wherein the laminator blank advancing means is a continuous belt which pushes the laminator blanks in a sliding guide.

7. The apparatus of claim 6, wherein the laminator blanks are advanced through the sliding guide and pass in front of the cutting device.

8. The apparatus of claim 1, wherein the laminator blank advancing means comprises gripping rollers.

9. The apparatus of claim 8, wherein the gripping rollers translate a lamination blank into a stationary cutting position and the cutting device passes in front of the lamination blank.

10. The apparatus of claim 1, wherein at least one of the lamination advancing means and the cutting means is positionable so as to permit the cutting of a beveled edge on a lamination.

11. The apparatus of claim 1, wherein the lamination advancing means and the cutting device are positionable so as to permit the cutting of a compound beveled edge on a lamination.

12. The apparatus of claim 1, wherein the lamination cutting device is selected from the group consisting of an Nd:YAG laser with a coaxial gas jet, a $CO_2$ type laser with a coaxial gas jet, an abrasive water jet, and a rotating endmill.

13. The apparatus of claim 1, further comprising a means for removing material cut away from each lamination.

14. The apparatus of claim 1, further comprising a loading container and wherein each of the loading and receiving containers have a side wall which is adjustable to correspond to the length of the lamination blanks.

15. The apparatus of claim 1, further comprising a means for removing any machining burrs left on the backside of a cut die lamination member.

16. The apparatus of claim 1, wherein the means for advancing lamination blanks comprises a sliding guide disposed adjacent to a lamination blank loading container and a means for placing a lamination blank into the sliding guide.

17. The apparatus of claim 16, further containing a means for disposing a cut lamination that has advanced completely past the cutting device into a receiving container; wherein said means for disposing works in conjunction with the placing means so that when a cut lamination is disposed in the receiving container another lamination blank is placed in the sliding guide.

18. The apparatus of claim 1, wherein the advancing means is a continuously moving belt having a pusher member attached thereto.

19. The apparatus of claim 1, further comprising means for removing material cut away from each lamination.

20. The apparatus of claim 1, further comprising means for rotating the cutting device.

21. The apparatus of claim 1, further comprising means for rotating the cutting device in two axes to make compound bevel cuts in a lamination.

22. The apparatus of claim 1, wherein each of the loading and receiving containers have a side wall which is adjustable to correspond to the length of the lamination blanks.

23. The apparatus of claim 1, wherein the lamination cutting device is selected from the group consisting of an Nd:YAG laser with a coaxial gas jet, a $CO_2$ type laser with a coaxial gas jet, an abrasive water jet, and a rotating endmill.

24. An apparatus for cutting a plurality of lamination blanks used to form a die comprising: a lamination blank loading container; a gripping means disposed adjacent to the loading container; a means for placing a lamination blank into the gripping means; a means for advancing a lamination blank into the gripping means; a lamination cutting device which is movable along the length of the lamination blank; the cutting device disposed adjacent the gripping means so that the cutting device passes in front of a lamination blank advancing into the gripping means; a means for disposing a cut lamination into a receiving container after the cutting device has advanced completely past the cut lamination; wherein said disposing means works in combination with the placing means so that when a cut lamination is disposed in the receiving container another lamination blank is placed in the gripping means.

25. The apparatus of claim 24, further comprising a means for removing material cut away from each lamination.

26. The apparatus of claim 24, further comprising means for rotating the cutting device.

27. The apparatus of claim 24, further comprising means for rotating the cutting device in two axes to make compound bevel cuts in a lamination.

28. The apparatus of claim 24, wherein each of the loading and receiving containers have a side wall which is adjustable to correspond to the length of the lamination blanks.

29. The apparatus of claim 24, wherein said disposing means works sequentially with the placing means so that when a cut lamination is disposed in the receiving container another lamination blank is sequentially placed in the gripping means.

* * * * *

UNITED STATES PATENT AND TRADEMARK OFFICE
CERTIFICATE OF CORRECTION

PATENT NO. : 5,793,015

DATED : Aug. 11, 1998

INVENTOR(S) : Daniel Walczyk

It is certified that error appears in the above-identified patent and that said Letters Patent is hereby corrected as shown below:

Claim 18, line 1: Delete "1" and insert --16--.

Claim 19, line 1: Delete "1" and insert --16--.

Claim 20, line 1: Delete "1" and insert --16--.

Claim 21, line 1: Delete "1" and insert --16--.

Claim 22, line 1: Delete "1" and insert --16--.

Claim 23, line 1: Delete "1" and insert --16--.

Signed and Sealed this

Twentieth Day of October, 1998

Attest:

BRUCE LEHMAN

Attesting Officer

Commissioner of Patents and Trademarks